United States Patent [19]

Vayda et al.

[11] Patent Number: 4,762,811

[45] Date of Patent: Aug. 9, 1988

[54] CASTABLE REFRACTORY

[75] Inventors: John T. Vayda; George H. Criss, both of Bethel Park, Pa.

[73] Assignee: Dresser Industries, Inc., Dallas, Tex.

[21] Appl. No.: 6,510

[22] Filed: Jan. 21, 1987

[51] Int. Cl.$^4$ ............................................. C04B 35/02
[52] U.S. Cl. ................................... 501/124; 501/125; 106/104
[58] Field of Search ................. 106/104; 501/124, 125

[56] References Cited

U.S. PATENT DOCUMENTS

| | | | |
|---|---|---|---|
| 3,563,776 | 2/1971 | Braniski et al. | 501/124 |
| 4,088,502 | 5/1978 | La Bar | 106/104 |
| 4,126,474 | 11/1978 | Talley et al. | 501/125 |
| 4,158,568 | 6/1979 | La Bar | 106/104 |
| 4,246,035 | 1/1981 | Maczura et al. | 106/104 |
| 4,348,236 | 9/1982 | Hines, Jr. et al. | 501/124 |
| 4,522,926 | 6/1985 | Felice | 501/127 |

*Primary Examiner*—Steven Capella
*Attorney, Agent, or Firm*—Sigalos, Levine & Montgomery

[57] ABSTRACT

A refractory composition capable, when mixed with water, of forming a hydraulic-setting castable refractory resistant to aluminum penetration and adhesion and with good load bearing properties consisting essentially of a refractory aggregate, a binder for said refractory aggregate, and an aluminum anti-adhesive agent; said agent consisting of a fine powder barium sulfate and a powdered zinc borosilicate frit in a weight ratio of 1.5:1 to 5:1.

7 Claims, No Drawings

CASTABLE REFRACTORY

BACKGROUND OF THE INVENTION

The present invention relates to refractory compositions capable, when mixed with water, of forming hydraulic-setting castable refractories for lining metallurgical vessels used to process metals containing large amounts of aluminum.

It is well known that lined vessels such as aluminum melting furnaces are subject to attack by the aluminum, often resulting in penetration by the aluminum into the lining, adhesion of the aluminum to the lining, and other corrosive effects of the aluminum on the lining.

Efforts to overcome this problem are described, for example, in U.S. Pat. Nos. 4,088,502 and 4,158,568, wherein amounts of a zinc borosilicate frit are added in an effort to prevent such corrosion. However, addition of such zinc borosilicates, while generally resulting in preventing penetration of aluminum into the lining, does not eliminate the problem of adhesion of the aluminum to the lining, making it difficult to separate the aluminum from the vessel and greatly decrease the load-bearing properties of the lining.

Others such as in U.S. Pat. No. 4,126,474 have added barium sulfate to the refractory in an effort to overcome these problems but it not only does not eliminate adherence of the metal to the refractory, but also tends to lower the load-bearing properties of the refractory.

Efforts to increase the strength of the castable are described in the prior art as in U.S. Pat. No. 4,348,236, which uses lower levels of the borosilicate frit in preparation of the castable, but here again there is strong adherence of the metal to the refractory.

SUMMARY OF THE INVENTION

The present invention provides a refractory composition which overcomes the problems heretofore experienced resulting in castable refractories resistant to aluminum penetration and adhesion and with good load-bearing properties.

Briefly, the present invention comprises a refractory composition capable, when mixed with water, of forming a hydraulic-setting capable refractory resistant to aluminum penetration and adhesion and with good load-bearing properties consisting essentially of a refractory aggregate, a binder for said refractory aggregate, and an aluminum anti-adhesive agent; said agent consisting of a fine powder barium sulfate and a powdered zinc borosilicate frit in a weight ratio of 1.5:1 to 5:1.

DETAILED DESCRIPTION

The essential components of the instant refractory composition are the refractory aggregate binder, and the aluminum anti-adhesive agent.

As to the refractory aggregate, it can be any conventionally utilized in forming castable materials for lining aluminum or aluminum alloy metal furnaces and the like heat-treating vessels. Most commonly these refractories are alumina materials such as fused bauxite, calcined bauxite, calcined alumina, calcined kaolin, mixtures thereof and the like aluminum-containing refractory materials commonly utilized for such castables.

In like manner, the binder utilized is that conventionally used heretofore in making such castable refractories. Most commonly are calcium aluminate, calcium silicate, lignin liquors, and so-called phosphate binders such as mono-aluminum phosphate.

The amount of refractory aggregate and binder in the composition is that conventionally used for forming the castable; namely, anywhere from 50 to 99 parts by weight of refractory (including anti-adhesive agent), and 1 to 50 parts by weight of the cement for each 100 parts by weight of the composition.

The critical aspect of the instant invention is the addition to the noted refractory and binder of an aluminum anti-adhesive agent. As previously noted, such agent consists of a fine barium sulfate and a fine zinc borosilicate frit.

The barium sulfate is as noted a powder; preferably a −65 mesh powder, and while a purified barium sulfate can be utilized, it is also possible to use the barite which most usually contains at least 80% by weight barium sulfate. It has been found that the other usual constituents of the barite ore such as silica, alumina, titania, iron oxide, lime, magnesia, soda, potash and the like are present in such minor amounts that they do not adversely affect the properties desired in the instant composition.

As to the zinc borosilicate, it should also be a fine powdery material and any of the conventional zinc borosilicates used heretofore as additives to these castables, such as is described in U.S. Pat. Nos. 4,088,502 and 4,158,568 can be utilized for this purpose. It is preferred to use a −325 mesh material.

As to proportions, it has been found most suitable that the aluminum anti-adhesive agent should containt from about 1.5 to 5 parts of a barium sulfate for each part by weight of the zinc borosilicate.

As to the entire refractory composition, it has been found that the anti-adhesive agent need only be added in an amount from 5 to 15 parts by weight for each 100 parts by weight of the total composition.

Topical compositions representing minimum and maximum proportions of the refractory aggregate and binder (in parts by weight) are:

|  | Min. | Max. |
| --- | --- | --- |
| Refractory Aggregate | 92 | 43 |
| Binder | 1 | 50 |
| Aluminum Anti-adhesive Agent | 7 | 7 |

With respect to the particle sizes of the mix, it can have the following mesh (Tyler) grind:

| Screen Sizes | Operable (% by Weight) | Preferred (% by Weight) |
| --- | --- | --- |
| −4/+10 | 22–28 | 26 ± 3% |
| −10/+28 | 20–26 | 23 |
| −28/+65 | 8–10 | 11 |
| −65 | 38–44 | 40 ± 3 |
| −325 | 22–28 | 25% min. |

The particulate refractory composition is formed by simply admixing the particular refractory material, particulate binder, and the aluminum anti-adhesive agent to ensure thorough admixture. When it is desired to form the castable, whether in the form of a brick, slab, or ramming mix or any other form commonly used to line such aluminum furnaces, it is simply necessary to add the liquid to be utilized, mix it thoroughly and form the material into the desired end product.

It will be evident that the amount of liquid utilized will vary depending upon the product to be formed; namely a ramming mix, brick or other refractory shape or structure.

As noted, it has been found that the products of the instant invention form hydraulic-setting castable refractories which are resistant not only to aluminum penetration but also to aluminum adhesion while still retaining good load-bearing properties.

These advantages of the instant invention are clearly set forth in the following examples which are set forth for purposes of illustration only.

EXAMPLES 1 TO 3

A series of particulate refractory mixes were prepared in which the zinc borosilicate frit was held constant. Castable products were formed of these mixes in the conventional manner by admixing them with water and the resulting products were tested for aluminum penetration and adhesion using the ALCOA 72 hr. Aluminum Cup Test. The castable constituents, proportions, and test results are set forth in Table I below.

TABLE I

| Example | 1 | 2 | 3 |
|---|---|---|---|
| Mix: | | | |
| Fused Bauxite | | | |
| −6/+10 mesh | 26% | 26% | 26% |
| −1/+30 mesh | 21 | 21 | 21% |
| −36/+120 mesh | 18 | 18 | 18 |
| DCF | 4 | 6.5 | 9 |
| Barite, −65 mesh [Magcobar] | 10 | 7.5 | 5 |
| Zinc borosilicate frit powder, −325 mesh (4GF-27-B) | 1 | 1 | 1 |
| CA-25 Cement* | 20 | 20 | 20 |
| Plus Additions: Water | 6.9 | 7.0 | 7.0 |
| Casting Properties: | All mixes cast and flowed well. | | |
| Alcoa 72 Hr. Aluminum Cup Test Using 7075 Alloy** at 1500° F. | | | |
| Depth of Penetration | 0 | 0 | 0 |
| Amount of Adherence | Strong | Strong | Strong |
| Metal Pick-Up From Refractory | | | |
| Si: | 0.08 | 0.14 | 0.13 |
| Fe: | 0.09 | 0.10 | 0.16 |
| Mg: | −1.68 | −1.53 | −1.26 |

*CA-25 Cement is composed of 80% alumina, 18% lime with 1.5% loss on ignition and minor impurities. This hydraulically setting composition conforms to the empirical molar formula CaO.2.5 Al₂O₃. The predominate bonding phase is monocalcium aluminate (CaO.Al₂O₃) with minor secondary phases of 12 CAO.7 Al₂O₃ and CAO.2 Al₂O₃.
**7075 Alloy is one of the highest strength aluminum alloys available and is used for air-frame structures and for highly stressed parts. It was chosen for the ALCOA 72-hour aluminum cup test because the high magnesium content makes it particularly aggressive on refractory linings. The 7075 alloy contains 0.50% silicon, 0.7% iron, 1.2–2.0% copper, 0.30% manganese, 2.1–2.9% magnesium, 0.18–0.40% chromium, 5.1–6.1% zinc, 0.20% titanium and the remainder aluminum.

These results show that despite increasing amounts of barite there was strong adherence of the aluminum alloy to the refractory after cup testing.

EXAMPLES 4 TO 6

The constituents, procedures and tests of Examples 1 to 3 were followed, except that the amount of zinc borosilicate frit in the mixes was doubled. The constituents, proportions, and test results are set forth in Table II below.

TABLE II

| Example | 4 | 5 | 6 |
|---|---|---|---|
| Mix: | | | |
| Fused Bauxite | | | |
| −6/+10 mesh | 26% | 26% | 26% |
| −1/+30 mesh | 21 | 21 | 21% |
| −36/+120 mesh | 18 | 18 | 18 |
| DCF | 3 | 5.5 | 8 |
| Barite, −65 mesh [Magcobar] | 10 | 7.5 | 5 |
| Zinc borosilicate frit powder, −325 mesh (4GF-27-B) | 2 | 2 | 2 |
| CA-25 Cement | 20 | 20 | 20 |
| Plus Additions: Water | 6.7 | 6.7 | 6.7 |
| Casting Properties: | All mixes cast and flowed well. | | |
| Alcoa 72 Hr. Aluminum Cup Test Using 7075 Alloy at 1500° F. | | | |
| Depth of Penetration | 0 | 0 | 0 |
| Amount of Adherence | Slight | Slight | Slight |
| Metal Pick-Up From Refractory | | | |
| Si: | 0.13 | 0.25 | 0.36 |
| Fe: | 0.10 | 0.13 | 0.09 |
| Mg: | −1.52 | −0.93 | −0.96 |

The metal showed less adhesion to these refractories, but still could not be easily removed therefrom.

EXAMPLES 7 TO 9

The constituents, procedures and tests of Examples 1 to 3 were followed, except that the amount of zinc borosilicate frit was tripled. The constituents, proportions, and test results are set forth in Table III below.

TABLE III

| Example | 7 | 8 | 9 |
|---|---|---|---|
| Mix: | | | |
| Fused Bauxite | | | |
| −6/+10 mesh | 26% | 26% | 26% |
| −1/+30 mesh | 21 | 21 | 21% |
| −36/+120 mesh | 18 | 18 | 18 |
| DCF | 2 | 4.5 | 7 |
| Barite, −65 mesh [Magcobar] | 10 | 7.5 | 5 |
| Zinc borosilicate frit powder, −325 mesh (4GF-27-B) | 3 | 3 | 3 |
| CA-25 Cement | 20 | 20 | 20 |
| Plus Additions: Water | 6.7 | 6.5 | 6.6 |
| Casting Properties: | All mixes cast and flowed well. | | |
| Alcoa 72 Hr. Aluminum Cup Test Using 7075 Alloy at 1500° F. | | | |
| Depth of Penetration | 0 | 0 | 0 |
| Amount of Adherence | None | None | None |
| Metal Pick-Up From Refractory | | | |
| Si: | 0.54 | 0.48 | 0.37 |
| Fe: | 0.10 | 0.09 | 0.08 |
| Mg: | −1.47 | −0.96 | −1.17 |

There was no metal penetration and no metal adherence to the refractory.

Examples 4 to 9 were further tested for physical properties and the mixes of Examples 6 and 9 were also tested for true deformation since Example 6 had the lowest iron pick-up and Example 9 the lowest silicon pick-up. The results are set forth in Table IV below.

TABLE IV

| Example | 4 | 5 | 6 | 7 | 8 | 9 |
|---|---|---|---|---|---|---|
| Amounts of Additives | | | | | | |
| Barite, −65 mesh | 10 | 7.5 | 5 | 10 | 7.5 | 5 |
| Zinc borosilicate frit powder | 2 | 2 | 2 | 3 | 3 | 3 |
| Bulk Density, psi (Av 3) | | | | | | |
| After Drying at 250° F.: | 188 | 187 | 186 | 189 | 190 | 190 |
| Modulus of Rupture, psi (Av 3) | | | | | | |
| After Drying at 250° F.: | 1950 | 2060 | 2000 | 2310 | 2610 | 2850 |
| At 1500° F.: | 1500 | 1540 | 1520 | 1540 | 1760 | 1770 |
| At 2000° F.: | 1430 | 1420 | 1360 | 1320 | 1300 | 1290 |
| Cold Crushing Strength, psi (Av 3) After Drying at 250° F.: | 8610 | 7680 | 9840 | 10490 | 11480 | 11700 |
| Apparent Porosity, % (Av 3) After Drying at 250° F.: | 11.7 | 11.6 | 12.2 | 11.2 | 11.8 | 11.7 |
| True Deformation, At 2640° F. Held for 6 Hrs Under 25 psi % Subsidence: | — | — | 7.0 | — | — | 7.0 |

All showed good densities and strengths and low deformation.

EXAMPLES 10 TO 13

To show the effects of not utilizing any barite, the constituents of Examples 1 to 3 were used except that, of course, no barite was included and the amounts of zinc borosilicate frit were varied. The constituents, proportions, and test results are set forth in Table V below.

TABLE V

| Example | 10 | 11 | 12 | 13 |
|---|---|---|---|---|
| Mix: | | | | |
| Fused Bauxite | | | | |
| −6/+10 mesh | 26% | 26% | 26% | 26% |
| −1/+30 mesh | 21 | 21 | 21% | 21 |
| −36/+120 mesh | 18 | 18 | 18 | 18 |
| DCF | 14 | 13 | 12 | 11 |
| Zinc borosilicate frit powder, −325 mesh (4GF-27-B) | 1 | 2 | 3 | 4 |
| CA-25 Cement | 20 | 20 | 20 | 20 |
| Plus Additions: Water | 7.3 | 7.4 | 7.4 | 7.4 |
| Casting Properties: | All mixes cast and flowed well. | | | |
| Alcoa 72 Hr. Aluminum Cup Test Using 7075 Alloy at 1500° F. | | | | |
| Depth of Penetration | 0 | 0 | 0 | 0 |
| Amount of Adherence | Strong | Strong | Strong | None |
| Metal Pick-Up From Refractory | | | | |
| Si: | 0.20 | 0.51 | 0.43 | −0.03 |
| Fe: | 0.09 | 0.05 | 0.02 | 0.04 |
| Mg: | −1.01 | −0.85 | −0.59 | −0.44 |

These results show that in all instances, when only up to 3% zinc borosilicate frit was used, there was strong metal adhesion to the refractory. Examples 7 to 9 show that at 3% zinc borosilicate frit level, but with barite addition, there was no metal adherence. It was necessary to utilize at least 4% zinc borosilicate to avoid adherence.

EXAMPLES 14 TO 17

To show the poor load resistance of using either frit alone, or barite, the constituents of Examples 1 to 3 were used except that the proportions thereof were varied because of the inclusion of only frit, barite, or neither. The constituents, proportions, and test results are set forth in Table VI below.

TABLE VI

| Example | 14 | 15 | 16 | 17 |
|---|---|---|---|---|
| Mix: | | | | |
| Fused Bauxite | | | | |
| −6/+10 mesh | 26% | 26% | 26% | 26% |
| −10/+30 mesh | 20 | 20 | 20 | 20 |
| −36/+120 mesh | 18 | 18 | 18 | 18 |
| DCF | 16 | 11 | 11 | 6 |
| Zinc borosilicate Frit Powder | | | | |
| −325 mesh (5580) | — | 5 | — | — |
| (4GF-27-B) | — | — | 5 | — |
| Barite, −65 mesh (Magcobar) | — | — | — | 10 |
| CA-25 Cement | 20 | 20 | 20 | 20 |
| Plus Additions: Water | 7.5 | 7.6 | 7.5 | 7.5 |
| Method of Forming: | Vibration Cast Using Minimum Amplitude | | | |
| Casting Properties: | All Mixes Cast and Flowed Very Well | | | |
| Bulk Density, pcf (Av 3) After Drying at 250° F.: | 182 | 179 | 180 | 183 |
| Modulus of Rupture, psi (Av 3) | | | | |
| After Drying at 250° F.: | 2230 | 2210 | 2000 | 2160 |
| At 1500° F.: | 2040 | 1530 | 1350 | 1850 |
| At 2000° F.: | 1210 | 250 | 210 | 1330 |
| Cold Crushing Strength, psi (Av 3) After Drying at 250° F.: | 7900 | 10230 | 10440 | 9420 |
| Apparent Porosity, % (Av 3) | 19.5 | 18.9 | 19.7 | 19.7 |

TABLE VI-continued

| Example | 14 | 15 | 16 | 17 |
|---|---|---|---|---|
| After Drying at 250° F.: | | | | |
| True Deformation, at 2640° F. Held for 6 hr, Loaded Under 25 psi, % Subsidence: | 5.5 | Failed | Failed | 8.2 |
| Alcoa 72 hr Aluminum Cup Test Alloy 1075 at 1500° F. | | | | |
| Depth of Penetration: | 0 | 0 | 0 | 0 |
| Adherence: | Moderate | None | None | Moderate |
| Metal Pickup from Refractory | | | | |
| Si: | 0.07 | 0.01 | 0.06 | −0.09 |
| Fe: | 0.10 | 0.02 | 0.05 | 0.09 |
| Mg: | −1.49 | −1.20 | 0.18 | −1.56 |

These results show that a 5% addition of frit made the castable penetration resistant to the aluminum, but the products of Examples 15 and 16 both failed in the True Deformation load test. A load subsidence of over 12% was considered a failure. The mix of Example 14, without the frit exhibited only 5.5% subsidence and that of Example 17 had a subsidence of 8.2%.

The previous tests, such as Example 9, show that using both frit and barite permits them to be used in reduced amounts while still maintaining both good resistance to aluminum penetration and good load bearing properties.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A refractory composition capable, when mixed with water, of forming a hydraulic-setting castable refractory resistant to aluminum penetration and adhesion and with good load bearing properties consisting essentially of a refractory aggregate, a binder for said refractory aggregate, and an aluminum anti-adhesive agent; said agent consisting of a fine powdered barium sulfate and a powdered zinc borosilicate frit in a weight ratio of 1.5:1 to 5:1 there being at least about 2% by weight of said borosilicate frit for each 100% by weight of said composition.

2. The composition of claim 1, wherein said aggregate is selected from fused bauxite, calcined bauxite, calcined alumina, calcined kaolin, or mixtures thereof.

3. The composition of claim 2, wherein said binder is selected from calcium aluminate, calcium silicate, lignin liquors, phosphate binders, or mixtures thereof.

4. The composition of claim 3, wherein said barium sulfate is a −65 mesh and said zinc borosilicate is a −325 mesh.

5. The composition of claim 1, 2, 3, or 4, wherein for each 100 parts by weight of the composition there is 45 to 84 parts by weight of refractory aggregate, 1 to 50 parts by weight of binder, and 5 to 15 parts by weight of aluminum anti-adhesive agent.

6. The composition of claim 1, 2, 3, or 4, wherein the composition has the following mesh (Tyler) grind:

| Screen Sizes | Operable (% by Weight) |
|---|---|
| −4/+10 | 22-28 |
| −10/+28 | 20-26 |
| −28/+65 | 8-10 |
| −65 | 38-44 |
| −325 | 22-28 |

7. The composition of claim 1, 2, 3, or 4, wherein the composition has the following mesh (Tyler) grind:

| Screen Sizes | Distribution (% by Weight) |
|---|---|
| −4/+10 | 26 ± 3% |
| −10/+28 | 23 |
| −28/+65 | 11 |
| −65 | 40 ± 3 |
| −325 | 25% min.-- |

* * * * *